(12) United States Patent
Liu et al.

(10) Patent No.: US 11,717,001 B1
(45) Date of Patent: Aug. 8, 2023

(54) SLICING AND COLLECTING DEVICE FOR PROCESSING FROZEN MEAT SHEETS

(71) Applicant: Northeast Agricultural University, Harbin (CN)

(72) Inventors: Qian Liu, Harbin (CN); Baohua Kong, Harbin (CN); Fangda Sun, Harbin (CN); Xin Li, Harbin (CN); Jianchun Han, Harbin (CN); Hongwei Zhang, Harbin (CN); Chuanai Cao, Harbin (CN); Yangyang Feng, Harbin (CN); Fengxue Zhang, Harbin (CN); Sumeng Wei, Harbin (CN); Shiwen Lin, Harbin (CN)

(73) Assignee: NORTHEAST AGRICULTURAL UNIVERSITY, Harbin (CN)

( * ) Notice: Subject to any disclaimer, the term of this patent is extended or adjusted under 35 U.S.C. 154(b) by 0 days.

(21) Appl. No.: 18/073,648

(22) Filed: Dec. 2, 2022

(30) Foreign Application Priority Data

Mar. 7, 2022 (CN) .......................... 202210215838.7

(51) Int. Cl.
| | |
|---|---|
| *A22C 17/00* | (2006.01) |
| *B65B 25/06* | (2006.01) |
| *B65B 43/22* | (2006.01) |
| *B65B 43/26* | (2006.01) |
| *B65B 35/20* | (2006.01) |

(52) U.S. Cl.
CPC ...... *A22C 17/0033* (2013.01); *A22C 17/0093* (2013.01); *B65B 25/065* (2013.01); *B65B 35/20* (2013.01); *B65B 43/22* (2013.01); *B65B 43/26* (2013.01)

(58) Field of Classification Search
CPC ... B65B 43/22; B65B 35/20; B65B 25/06–12; B65B 25/065; A22C 17/0093
See application file for complete search history.

(56) References Cited

U.S. PATENT DOCUMENTS

| | | | | |
|---|---|---|---|---|
| 3,340,992 | A * | 9/1967 | Seragnoli | ............... B65B 35/20 |
| | | | | 198/429 |
| 4,141,194 | A * | 2/1979 | Rochman | ............... B65B 5/045 |
| | | | | 53/529 |

(Continued)

FOREIGN PATENT DOCUMENTS

| | | |
|---|---|---|
| CN | 207491972 | 6/2018 |
| CN | 207972000 | 10/2018 |

(Continued)

*Primary Examiner* — Sean M Michalski
(74) *Attorney, Agent, or Firm* — Mayer & Williams, PC; Stuart H. Mayer

(57) ABSTRACT

Disclosed is a slicing and collecting device for processing frozen meat sheets, including a frame, and a slicing mechanism is arranged above the frame; a sliding plate is arranged on one side of the slicing mechanism, and a bagging mechanism is arranged on one side of the sliding plate far away from the slicing mechanism; a blocking structure is arranged between the sliding plate and the bagging mechanism, a loading mechanism is arranged on the other side of the slicing mechanism, a storage mechanism is arranged on one side of the loading mechanism far away from the slicing mechanism, and a bottom of the loading mechanism is communicated with the storage mechanism.

9 Claims, 12 Drawing Sheets

(56) References Cited

U.S. PATENT DOCUMENTS

| | | | | |
|---|---|---|---|---|
| 4,245,453 | A * | 1/1981 | Altenophl | B65B 43/36 53/385.1 |
| 6,407,818 | B1 * | 6/2002 | Whitehouse | G01B 11/00 356/627 |
| 11,338,462 | B2 * | 5/2022 | Einloft-Velte | B26D 1/565 |
| 2004/0112459 | A1 * | 6/2004 | Erb | B65B 3/045 141/114 |
| 2004/0128954 | A1 * | 7/2004 | Melville | B65B 25/065 53/473 |
| 2005/0229547 | A1 * | 10/2005 | Koke | B65B 25/065 53/468 |
| 2009/0214724 | A1 * | 8/2009 | Gordon | A22C 17/0093 426/410 |
| 2010/0119678 | A1 * | 5/2010 | Sammel | B26D 1/02 426/518 |
| 2010/0269453 | A1 * | 10/2010 | Takai | B65B 43/48 53/391 |
| 2013/0174514 | A1 * | 7/2013 | Wilkinson | B65B 35/24 53/260 |
| 2014/0360134 | A1 * | 12/2014 | Brinkman | B65B 31/022 53/95 |
| 2015/0191261 | A1 * | 7/2015 | Clark | B65B 35/46 53/147 |
| 2015/0251790 | A1 * | 9/2015 | Nakamoto | B65G 47/52 414/796.5 |
| 2016/0104339 | A1 * | 4/2016 | Saccone, Jr. | G07F 13/00 83/707 |
| 2016/0214752 | A1 * | 7/2016 | Ono | B65B 57/04 |
| 2017/0113368 | A1 * | 4/2017 | Schmeiser | B26D 7/01 |
| 2018/0099769 | A1 * | 4/2018 | McDonald | B65B 57/04 |
| 2018/0192657 | A1 * | 7/2018 | Repinski | A21D 2/34 |
| 2019/0270532 | A1 * | 9/2019 | Johnson | B65B 27/125 |
| 2020/0207492 | A1 * | 7/2020 | Jeon | B65B 43/30 |
| 2020/0282584 | A1 * | 9/2020 | Einloft-Velte | B65H 39/16 |
| 2021/0169091 | A1 * | 6/2021 | Mayr | A22C 7/0046 |
| 2021/0259468 | A1 * | 8/2021 | Backus | A23L 5/17 |
| 2022/0007661 | A1 * | 1/2022 | Bjarnason | B26D 7/01 |
| 2022/0039409 | A1 * | 2/2022 | Gronkjær | B26D 1/16 |
| 2022/0380079 | A1 * | 12/2022 | Golles | B65B 25/04 |

FOREIGN PATENT DOCUMENTS

| | | |
|---|---|---|
| CN | 110178881 A | 8/2019 |
| CN | 112075481 A | 12/2020 |
| CN | 112790227 A | 5/2021 |
| DE | 102008018173 | 10/2009 |

* cited by examiner

SLICING AND COLLECTING DEVICE FOR PROCESSING FROZEN MEAT SHEETS

CROSS-REFERENCE TO RELATED APPLICATIONS

This application claims priority to Chinese Patent Application No. 202210215838.7, filed on Mar. 7, 2022, the contents of which are hereby incorporated by reference.

TECHNICAL FIELD

The application relates to the field of meat product processing equipment, and in particular to a slicing and collecting device for processing frozen meat sheets.

BACKGROUND

Meat is rich in protein, and a content is generally between 10-20%. Protein in meat is high-quality. The protein in meat not only contains a wide range of essential nitrogen-based acids, but also has a proper proportion close to the protein of human body, and is easy to be digested and absorbed. People often need to slice the meat into sheets before eating.

For meat slicing, people slice the meat into the sheets after freezing to make the meat easy to eat. An existing frozen meat slicing machine usually puts the frozen meat under a cutter, and slices the meat by constantly pushing the frozen meat. The existing meat slicing machine needs people to place the frozen meat manually, and the machine does not have a function of automatic bagging machine, so it cannot be used conveniently.

SUMMARY

An objective of the application is to provide a slicing and collecting device for processing frozen meat sheets, so as to solve the above problems, automatically feed and slice meat sheets, and meanwhile automatically bag the meat sheets, and facilitate a slicing operation of the frozen meat.

To achieve the above object, the application provides a following solution:

a slicing and collecting device for processing frozen meat sheets, including a frame, and a slicing mechanism is arranged above the frame; a sliding plate is arranged on one side of the slicing mechanism, and a bagging mechanism is arranged on one side of the sliding plate far away from the slicing mechanism; a blocking structure is arranged between the sliding plate and the bagging mechanism, a loading mechanism is arranged on the other side of the slicing mechanism, a storage mechanism is arranged on one side of the loading mechanism far away from the slicing mechanism, and a bottom of the loading mechanism is communicated with the storage mechanism; and the slicing mechanism is used to cut a frozen meat, the storage mechanism is used to store the frozen meat and send the frozen meat to the loading mechanism, the loading mechanism is used to send the frozen meat to the slicing mechanism, and the bagging mechanism is used to bag the frozen meat cut by the slicing mechanism.

In an embodiment, the storage mechanism includes a storage shell, and the storage shell is fixedly connected above the frame; a plurality of storage partitions are arranged in the storage shell at equal intervals, and a feeding structure is arranged under a bottom of the storage shell; the bottom of the storage shell is provided with a plurality of bottom located grooves, and each bottom located groove is located between every two storage partitions, and the feeding structure partially extends into the bottom located grooves.

In an embodiment, feeding structure includes a horizontally sliding feeding slide plate, a top of the feeding slide plate is rotatably connected with a plurality of feeding stoppers, and each feeding stopper has an L-shaped structure; one end of each feeding stopper extends into each bottom located groove, and the other end of each feeding stopper is set away from the slicing mechanism; a feeding spring is fixedly connected between a bottom surface of the other end of each feeding stopper and a top surface of the feeding slide plate, and both ends of the feeding slide plate are slidably connected with feeding slide rails, and the feeding slide rails are fixedly connected with the frame.

In an embodiment, the loading mechanism includes a loading shell fixedly connected to a top of the frame, a plurality of loading baffles are arranged in the loading shell at equal intervals, a plurality of loading plates are vertically and slidably arranged at a bottom of the loading shell, each loading plate is located between every two loading baffles, and one end of each loading baffle is connected with a vertical driving part in a transmission way; each vertical driving part includes a loading screw rotatably connected to a side wall of the loading shell, one end of each loading plate is screwed with each loading screw, each loading screw is vertically arranged, and one end of each loading screw is connected with a loading motor in a transmission way; a bottom of the side wall of the loading shell close to the storage mechanism is provided with a feeding channel, and the feeding channel communicates with the loading shell and the storage shell.

In an embodiment, a top of the loading shell is horizontally and slidably connected with a bottom plate; a bottom of the bottom plate is provided with a bottom plate rack, and the bottom plate rack is meshed with a bottom plate gear, and the bottom plate gear is axially connected with a bottom plate motor; a top surface of the loading shell is horizontally and slidably provided with an ejector block, the two ends of the ejector block are fixedly connected with sliders of ejector ball screws, and ends of the ejector ball screws are drivingly connected with ejector motors, and a bottom surface of the ejector block contacts a top surface of the bottom plate.

In an embodiment, the bagging mechanism includes side mounting plates fixedly connected to front and rear sides of the frame; the side mounting plates are located at the side of the sliding plate far away from the slicing mechanism, and an inner side of each side mounting plate is rotatably connected with two articulated arms, and bag opening negative pressure rollers are rotatably connected between tops of the two corresponding articulated arms at a front side and a rear side; the bag opening negative pressure rollers are in hollow structures, and a side wall of each bag opening negative pressure roller is provided with a plurality of bag opening negative pressure holes; bottom ends of two articulated arms located on the same side are rotatably connected with two ends of a bag opening linear motor, and an inside of each side mounting plate is provided with articulated arm chutes; a rotating shaft located at the bottom ends of the articulated arms located on the same side is in sliding fit with the articulated arm chutes, one side of the articulated arms far from the slicing mechanism is provided with a bag feeding mechanism, and the bag opening negative pressure rollers are in transmission connection with bag opening negative pressure roller motors; the bag opening negative pressure rollers are rotationally connected to an outside of hollow shafts, and the side wall of each hollow shaft is provided with a number of negative pressure holes.

In an embodiment, the bag feeding mechanism includes a bag feeding slide plate horizontally arranged between two side mounting plates, a top of the bag feeding slide plate is rotatably connected with a bag storing roller, a side of the bag storing roller close to the articulated arms is provided with a bag feeding roller, a bottom of the bag feeding slide plate is fixedly connected with a bag feeding rack, the bag feeding rack is meshed with a bag feeding gear, and the bag feeding gear is axially connected with a bag feeding motor; the bag storing roller is connected with a bag storing roller motor, the bag feeding roller is connected with a bag feeding roller motor, a side wall of the bag feeding roller is provided with a plurality of bag feeding negative pressure holes, a center of the bag feeding roller is rotatably connected with the hollow shaft, and an outer side of the hollow shaft of the bag feeding roller is fixedly connected with an arc baffle, an outer side of the arc baffle is in contact with an inner side of the bag feeding roller, and the arc baffle is located at a lower part of the inner side of the bag feeding roller; and the blocking structure includes a blocking plate vertically and slidably connected between the two side mounting plates; the blocking plate is located at a bottom of the sliding plate, a bottom of the blocking plate is in contact with a push slider, and a top of the push slider is provided with an inclined plane with a same inclination direction as the sliding plate; one end of the push slider far from the blocking plate is fixedly connected with a blocking linear motor.

In an embodiment, the slicing mechanism includes a gantry fixedly connected to a top surface of the loading mechanism; the gantry is located at a side far away from the storage mechanism, and the side far away from the storage mechanism of the gantry is vertically and slidably connected with a slicing knife, an upper part of an inner side of the gantry is fixedly connected with a top fixing plate, and a slicing linear motor is fixedly connected between the slicing knife and the top fixing plate; a middle of the top fixing plate is screwed with a plurality of pressing screws, and the adjacent pressing screws have opposite screw directions; bottom ends of the pressing screws are rotatably connected with pressing mechanisms, and top ends of the pressing screws are rotatably connected with a vertical pressing part.

In an embodiment, the vertical pressing part includes a vertical slide plate vertically slidably connected in the gantry, and the vertical slide plate is rotationally connected with the pressing screws; a top of each pressing screw is fixedly connected with a meshing gear, and the adjacent meshing gears mesh with each other; one pressing screw is axially connected with a pressing motor, and the pressing motor is fixedly connected with the vertical slide plate; two ends of the vertical slide plate are fixedly connected with pressing sliders, and opposite inner side walls of the gantry are provided with pressing chutes, and the pressing sliders are in sliding fit with the pressing sliders.

In an embodiment, each pressing mechanism includes a pressing driving block rotatably connected with a bottom end of each pressing screw, a plurality of vertical sliding rods are slidably penetrated on each pressing driving block, one pressing block is fixedly connected to bottom ends of every four vertical sliding rods, pressing springs are fixedly connected between each pressing block and each pressing driving block, and the pressing springs are sleeved outside each vertical sliding rod.

The application has following technical effects.

According to the application, the storage mechanism stores the frozen meat, the storage mechanism sends the frozen meat into the loading mechanism, and then a loading structure transports the frozen meat to a top of the loading mechanism, and the loading structure pushes the frozen meat to the slicing mechanism for slicing; after the frozen meat is cut, the cut frozen meats are sent to the bagging mechanism through the sliding plate, and a bagging is completed. By arranging the storage mechanism, more frozen meats may be stored on the equipment, and a one-time operation duration of the equipment is longer; meanwhile, the storage mechanism and the loading mechanism cooperate together, so that the frozen meats may be continuously put into the storage mechanism during a meat slicing process, and a long-time operation of the equipment is ensured and a meat slicing efficiency of the equipment is greatly improved; meanwhile, a blocking mechanism is arranged at one side of the sliding plate to cooperate with the bagging mechanism to prevent frozen meat sheets from slipping off the sliding plate during a bag changing process of the bagging mechanism.

BRIEF DESCRIPTION OF THE DRAWINGS

In order to more clearly explain embodiments of the application or technical solutions in the prior art, the following briefly introduces drawings to be used in the embodiments. Obviously, the drawings in the following description are only some embodiments of the application. For those of ordinary skill in the art, other drawings may be obtained according to these drawings without any creative labor.

DETAILED DESCRIPTION OF THE EMBODIMENTS

Technical solutions in embodiments of the application are clearly and completely described below with reference to drawings in the embodiments of the application. Obviously, the described embodiments are only part of the embodiments of the application, but not all of them. Based on the embodiments of the application, all other embodiments obtained by ordinary technicians in the field without creative labor are within a scope of the application.

In order to make the above objects, features and advantages of the application more obvious and understandable, the application is explained in further detail below with reference to the drawings and detailed description.

Figure 1:
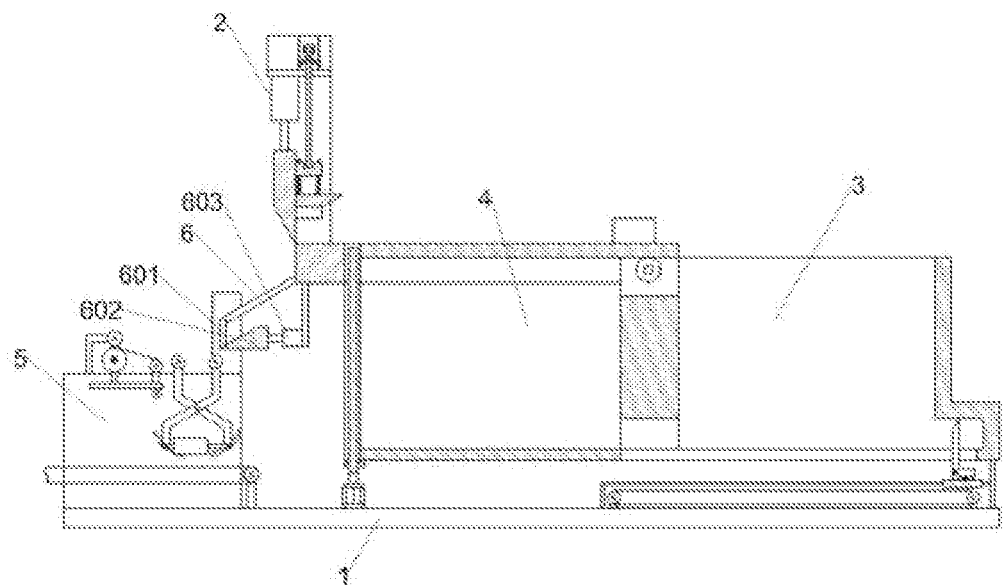
FIG. 1 is a schematic structural diagram according to the application.
Figure 2:
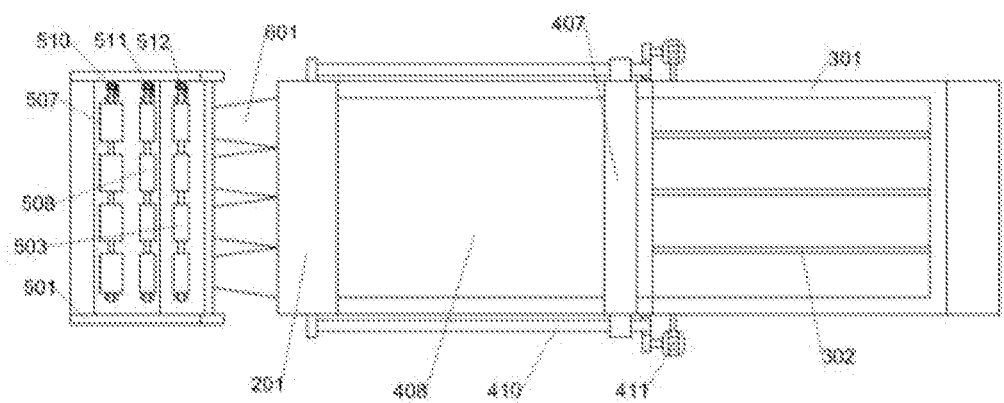
FIG. 2 is a schematic view of a top structure according to the application.
Figure 3:
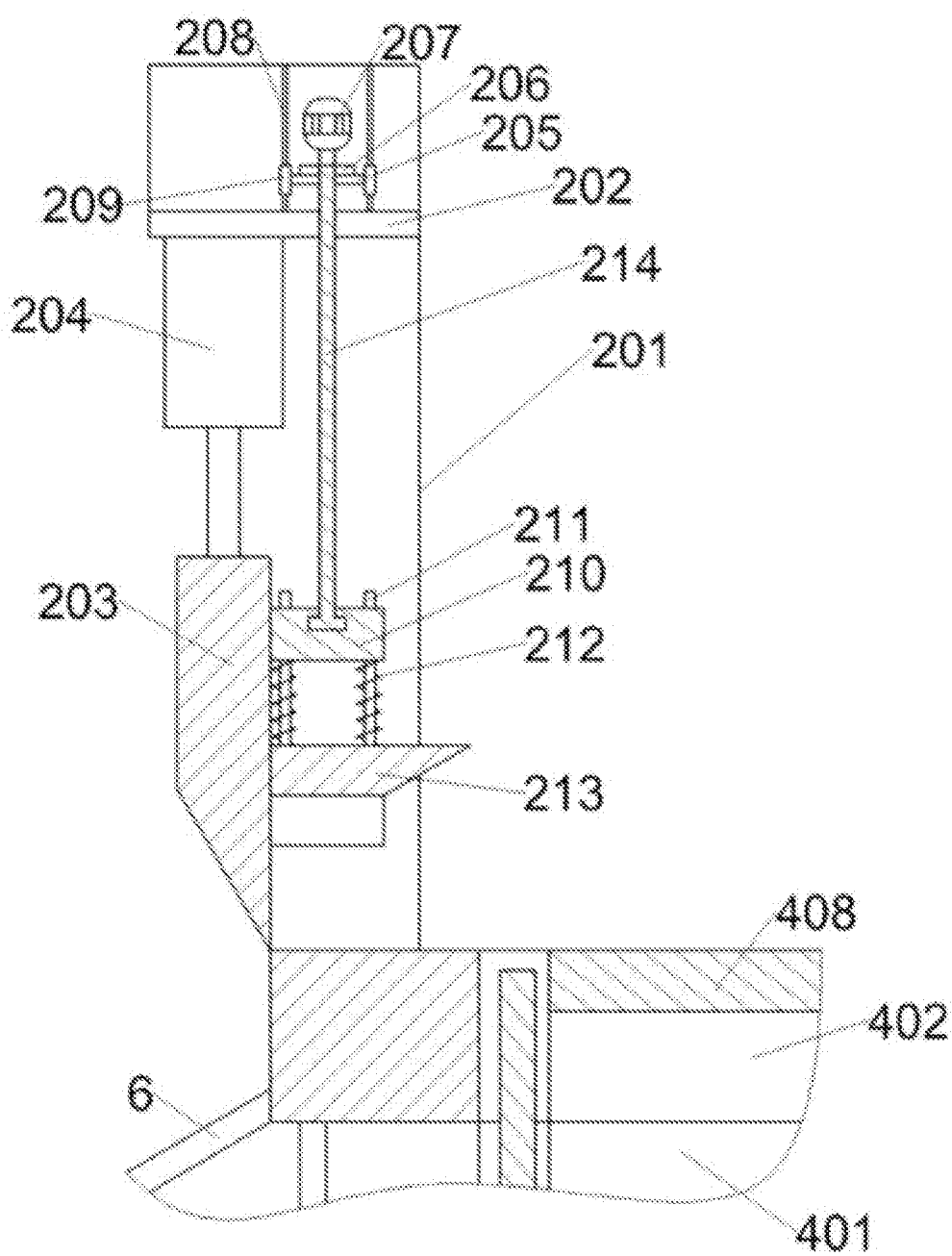
FIG. 3 is a schematic structural diagram of a slicing mechanism according to the application.
Figure 4:
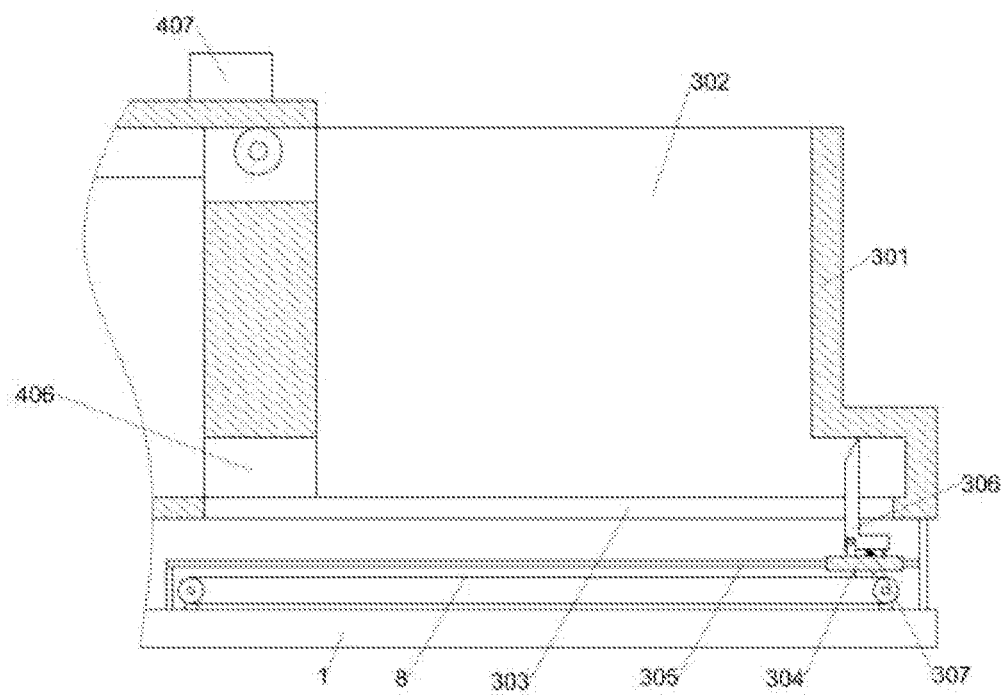
FIG. 4 is a schematic structural diagram of a storage mechanism according to the application.
Figure 5:
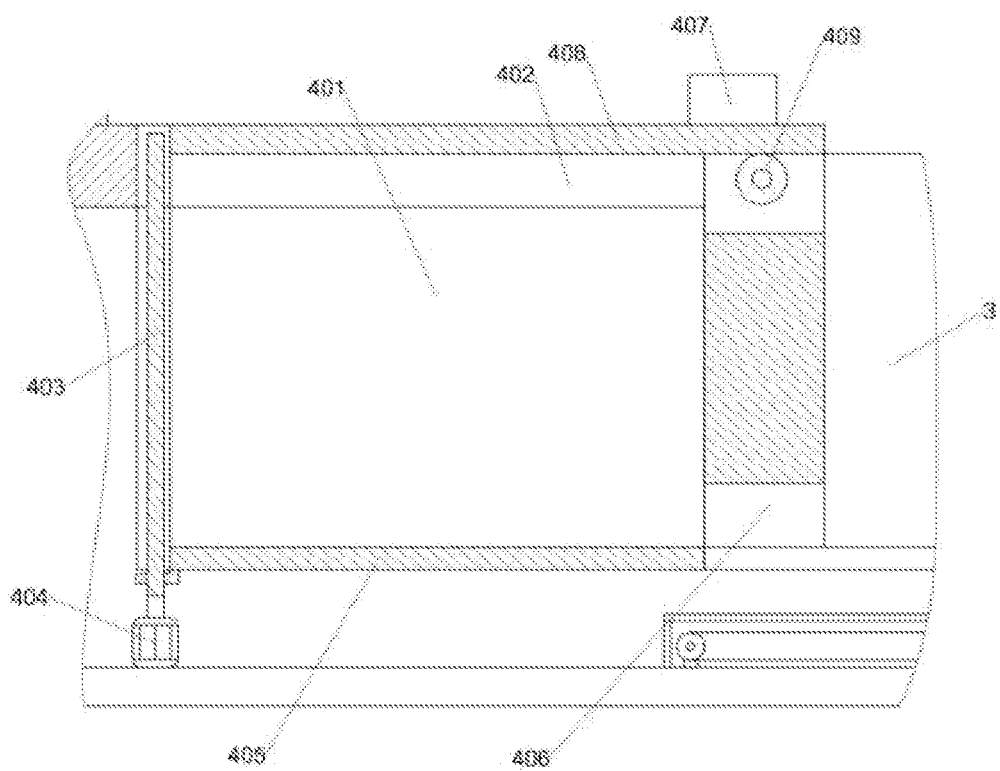
FIG. 5 is a schematic structural diagram of a loading mechanism according to the application.
Figure 6:
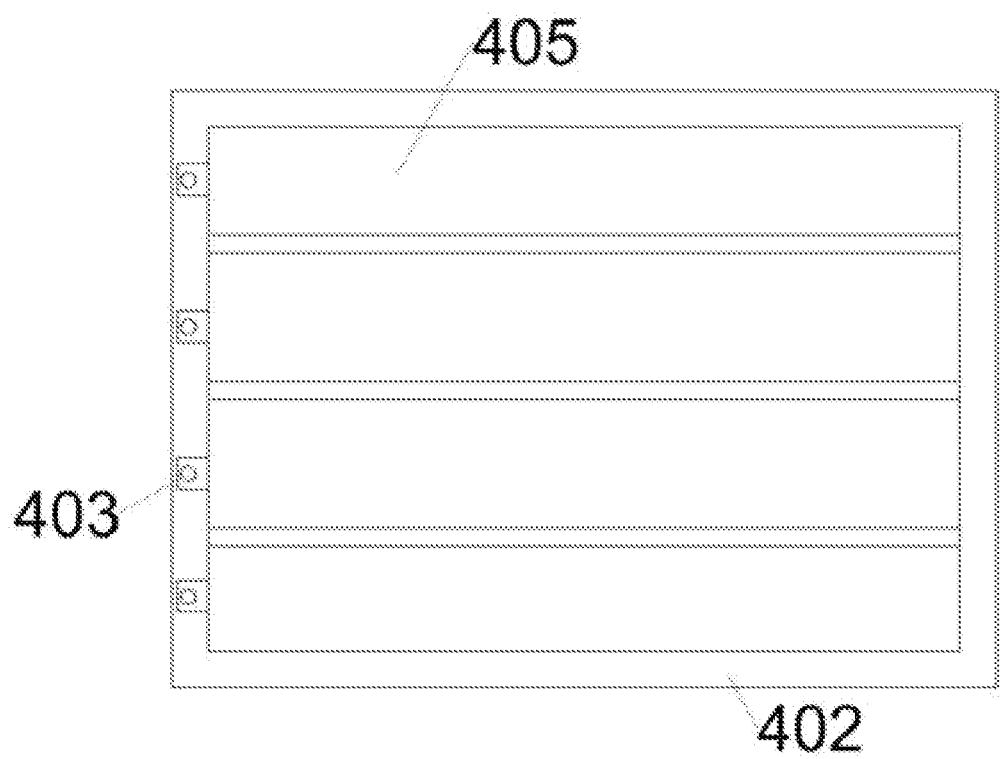
FIG. 6 is a schematic view of a top structure of a loading mechanism according to the application.
Figure 7:
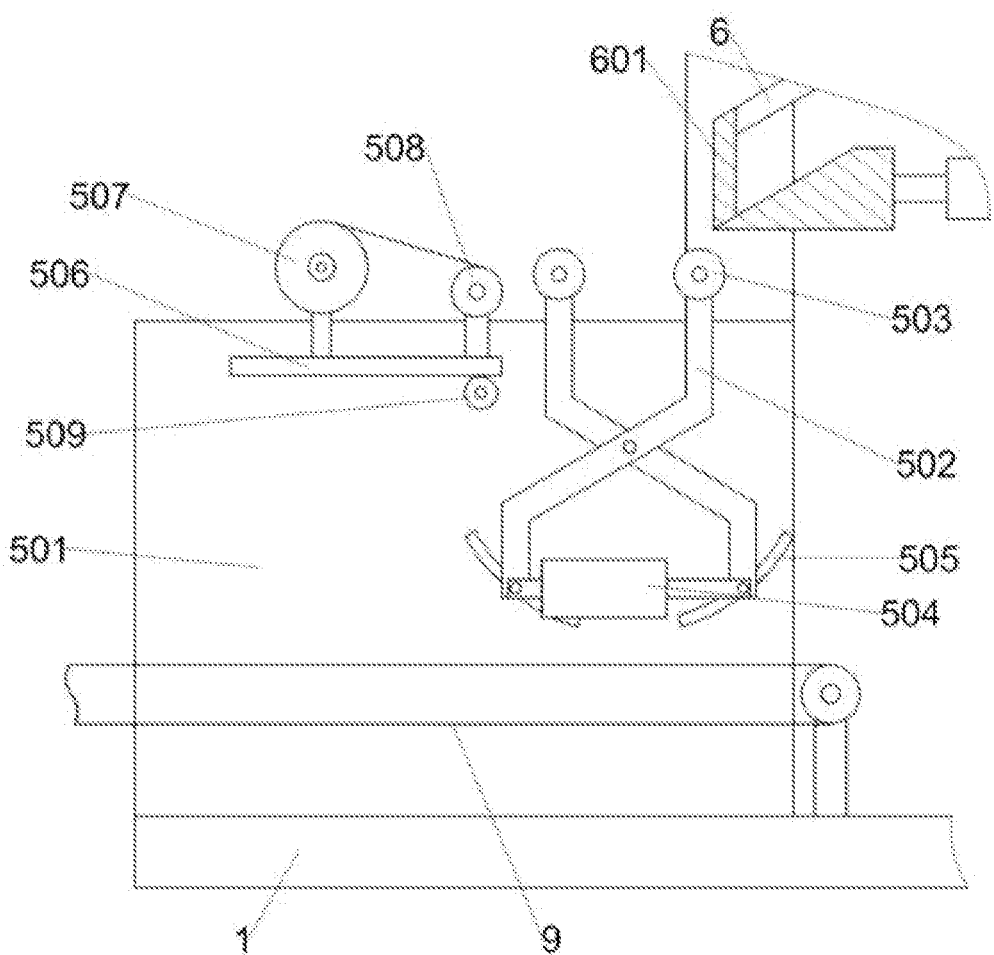
FIG. 7 is a schematic structural diagram of a bagging mechanism according to the application.
Figure 8:
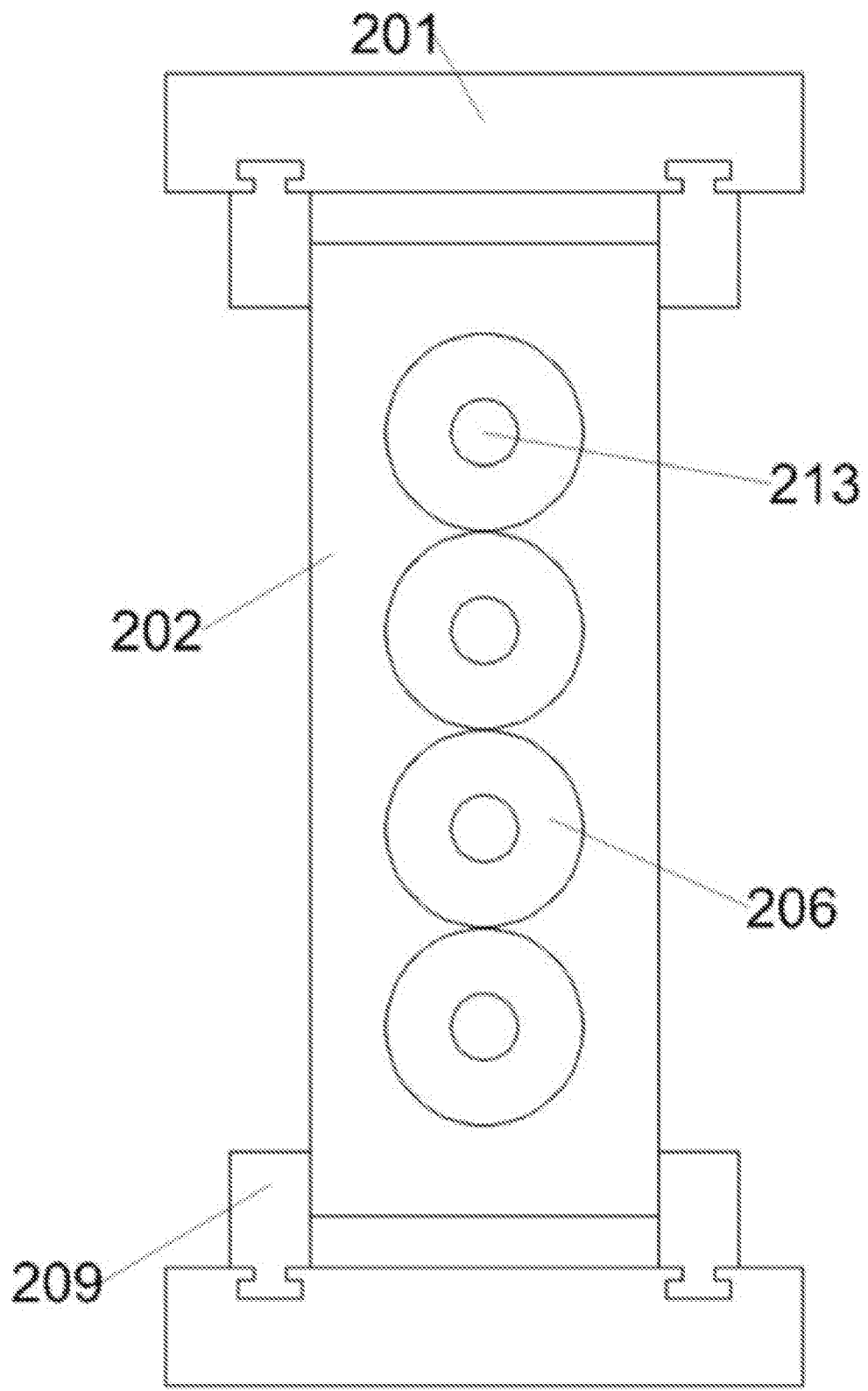
FIG. 8 is a schematic view of a top fixing plate according to the application.
Figure 9:
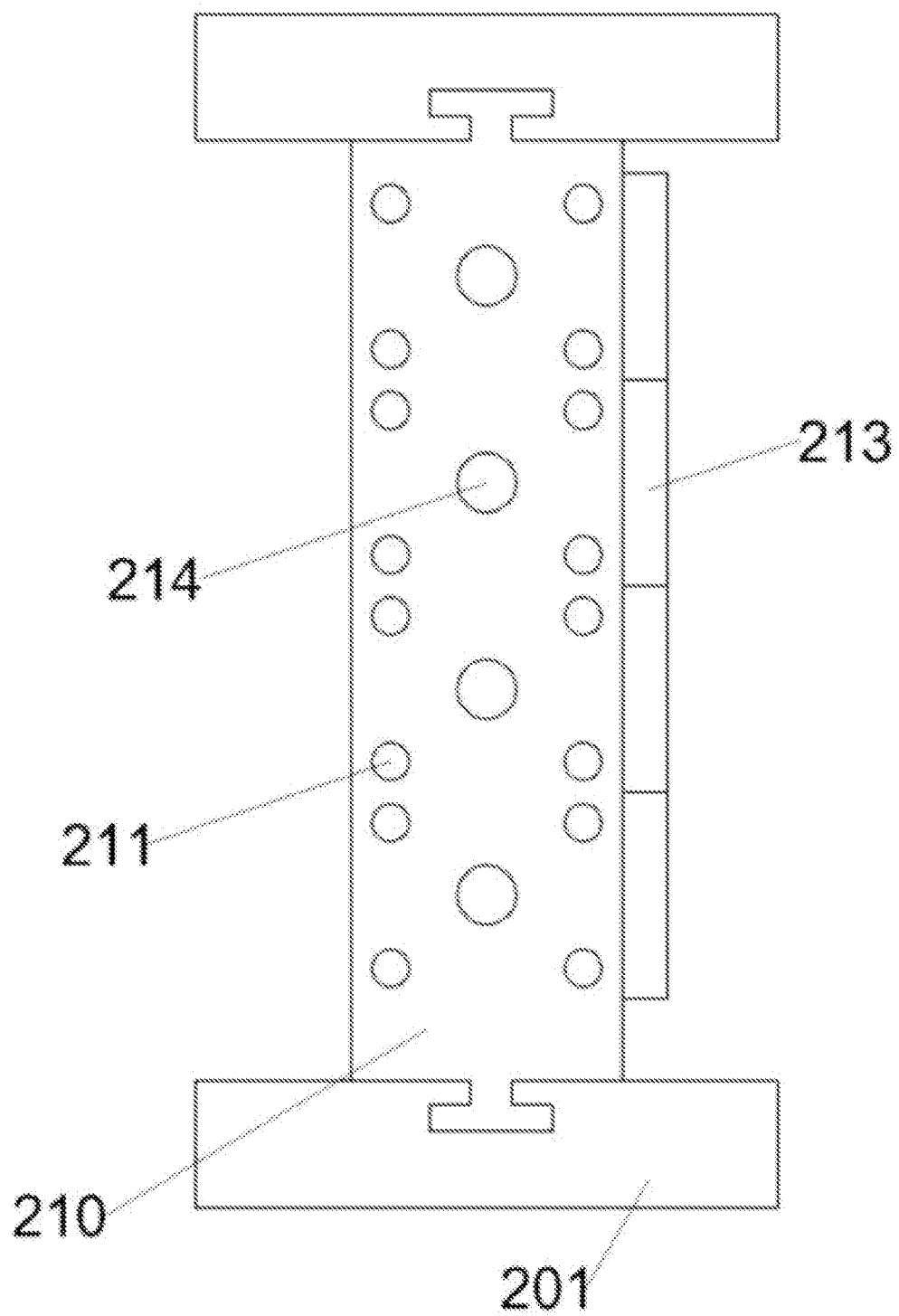
FIG. 9 is a schematic view of a top pressing driving block according to the application.
Figure 10:
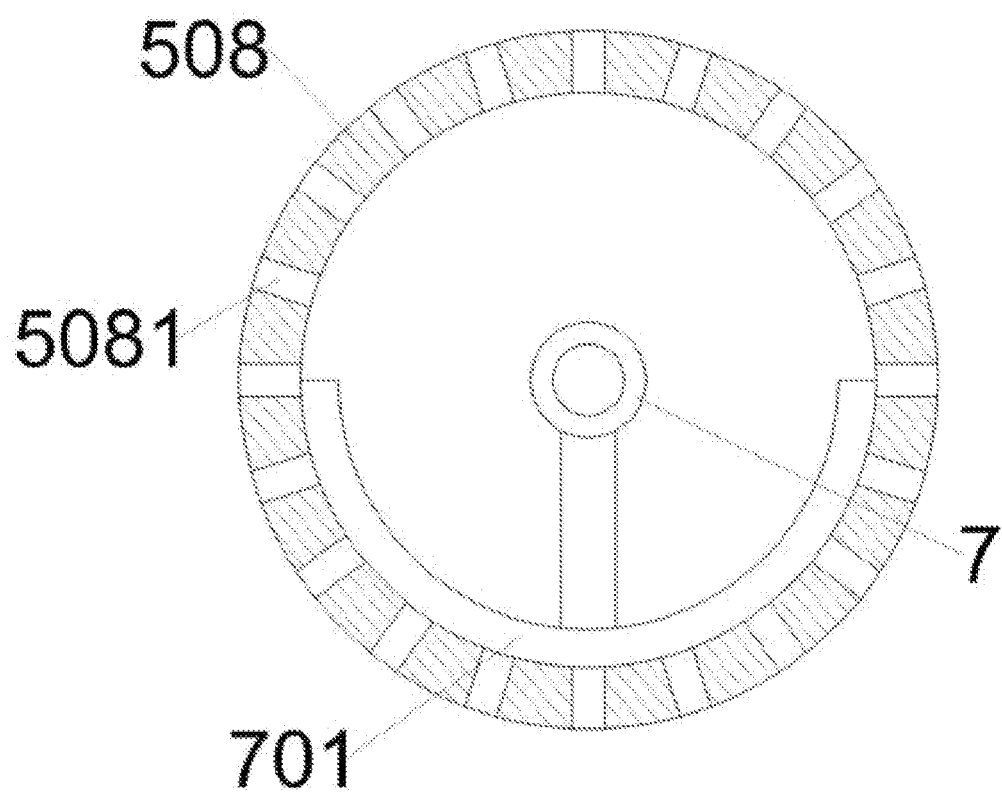
FIG. 10 is a schematic structural diagram of a bag feeding roller according to the application.
Figure 11:
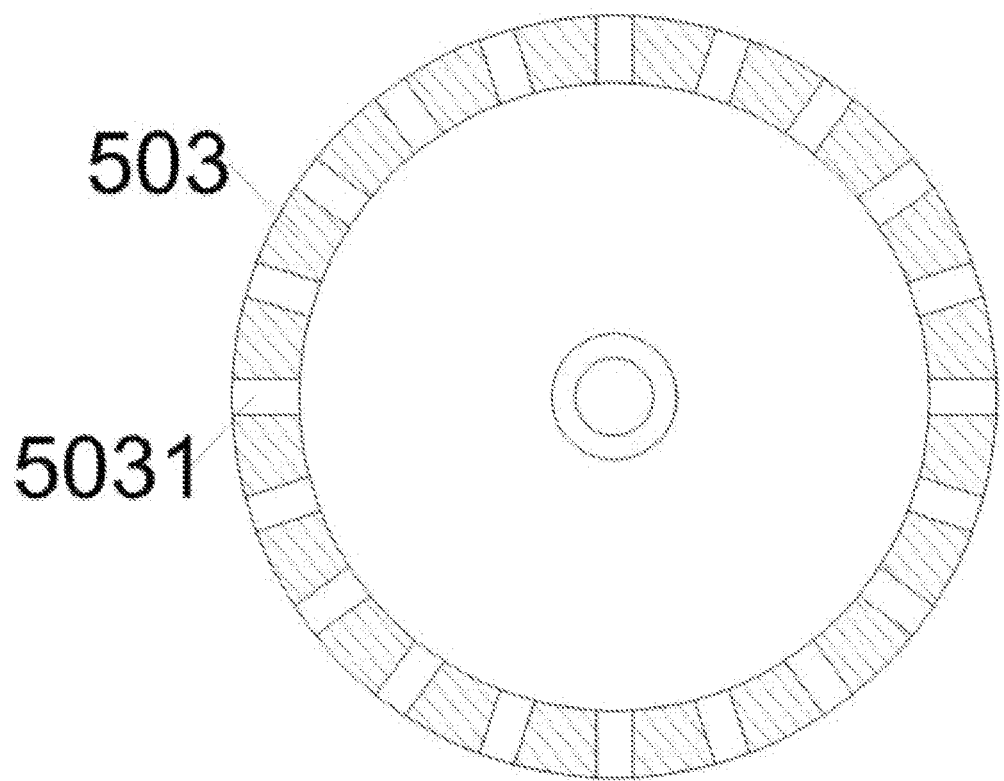
FIG. 11 is a schematic structural diagram of a bag opening negative pressure roller according to the application.
Figure 12:
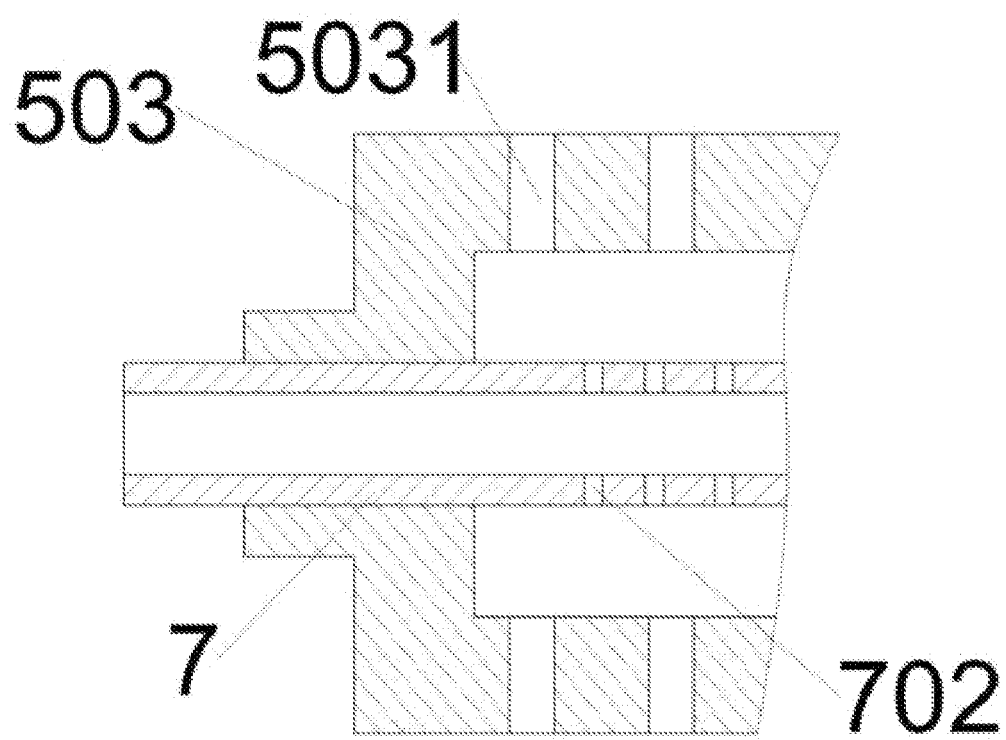
FIG. 12 is a schematic diagram of the matching structure between a bag opening negative pressure roller and a hollow shaft according to the application.

With reference to FIGS. 1-12, the application provides a slicing and collecting device for processing frozen meat sheets, including a frame 1, and a slicing mechanism 2 is arranged above the frame 1; a sliding plate 6 is arranged on one side of the slicing mechanism 2, and a bagging mechanism 5 is arranged on one side of the sliding plate 6 far away from the slicing mechanism 2; a blocking structure is arranged between the sliding plate 6 and the bagging mechanism 5, a loading mechanism 4 is arranged on the other side of the slicing mechanism 2, a storage mechanism 3 is arranged on one side of the loading mechanism 4 far away from the slicing mechanism 2, and a bottom of the loading mechanism 4 is connected with the storage mechanism 3; and the slicing mechanism 2 is used to cut a frozen meat, the storage mechanism 3 is used to store the frozen meat and send the frozen meat to the loading mechanism 4, the loading mechanism 4 is used to send the frozen meat to the slicing mechanism 2, and the bagging mechanism 5 is used to bag the frozen meat cut by the slicing mechanism 2.

According to the application, the storage mechanism 3 stores the frozen meat, the storage mechanism 3 sends the frozen meat into the loading mechanism 4, and then a loading structure transports the frozen meat to a top of the loading mechanism 4, and the loading structure pushes the frozen meat to the slicing mechanism 2 for slicing; after the frozen meat is cut, the cut frozen meats are sent to the bagging mechanism 5 through the sliding plate 6, and a bagging is completed. By arranging the storage mechanism 3, more frozen meats may be stored on the equipment, and a one-time operation duration of the equipment is longer; meanwhile, the storage mechanism 3 and the loading mechanism 4 cooperate together, so that the frozen meats may be continuously put into the storage mechanism 3 during a meat slicing process, and a long-time operation of the equipment is ensured and a meat slicing efficiency of the equipment is greatly improved; meanwhile, a blocking mechanism is arranged at one side of the sliding plate 6 to cooperate with the bagging mechanism 5 to prevent frozen meat sheets from slipping off the sliding plate 6 during a bag changing process of the bagging mechanism 5.

Further optimized scheme, the storage mechanism 3 includes a storage shell 301, and the storage shell 301 is fixedly connected above the frame 1; a plurality of storage partitions 302 are arranged in the storage shell 301 at equal intervals, and a feeding structure is arranged under the bottom of the storage shell 301. The bottom of the storage shell 301 is provided with a plurality of bottom located grooves 303, and each bottom located groove 303 is located between every two storage partitions 302, and the feeding structure partially extends into the bottom located grooves 303.

When processing the meat sheets, frozen meat strips are placed between every two storage partitions 302, and the feeding structure pushes a lowest layer of the frozen meat strips into the loading mechanism 4, and then the loading mechanism sends the frozen meat strips into the slicing mechanism 2 for slicing.

In an embodiment, the feeding structure includes a horizontally sliding feeding slide plate 304, the top of the feeding slide plate 304 is rotatably connected with a plurality of feeding stoppers 306, and each feeding stopper 306 has an L-shaped structure. One end of each feeding stopper 306 extends into each bottom located groove 303, and the other end of each feeding stopper 306 is set away from the slicing mechanism 2. A feeding spring 307 is fixedly connected between the bottom surface of the other end of each feeding stopper 306 and a top surface of the feeding slide plate 304, and both ends of the feeding slide plate 304 are slidably connected with feeding slide rails 305, and the feeding slide rails 305 are fixedly connected with the frame 1.

The bottom of the feeding slide plate 304 is provided with a feeding driving part; the feeding driving part is a belt assembly 8 arranged on the frame 1. Two belt pulleys are rotatably connected to the frame 1, one of the belt pulleys is connected with a belt motor in a driving way, and outer sides of the two belt pulleys are sleeved with a belt, so that the bottom of the feeding slide plate 304 is fixed with the outer side of the belt. When the frozen meat strips need to be fed into the loading mechanism 4, the belt motor is controlled to rotate, and the belt motor drives the belt pulleys to rotate, the belt pulleys drive the belt to move, and the belt drives the feeding slide plate 304 to move. The feeding slide plate 304 drives the feeding stoppers 306 above it to move toward the loading mechanism 4. After the frozen meat strips are pushed to the loading mechanism 4, the belt motor is controlled to rotate reversely. At this time, the feeding slide plate 304 retracts backward. During a retraction process, the frozen meat strips in the storage shell 301 block the feeding stoppers 306, and the feeding stoppers 306 rotate to retract. When the feeding slide plate 304 is restored to an initial position, under a pull of the feeding springs 307, the feeding stoppers 306 are restored to the initial position for a next use when pushing the frozen meat strips in the storage shell 301.

Further optimized scheme, the loading mechanism 4 includes a loading shell 402 fixedly connected to the top of the frame 1, a plurality of loading baffles 401 are arranged in the loading shell 402 at equal intervals, a plurality of loading plates 405 are vertically and slidably arranged at the bottom of the loading shell 402, each loading plate 405 is located between every two loading baffles 401, and one end of each loading baffle 401 is connected with a vertical driving part in a transmission way. Each vertical driving part includes a loading screw 403 rotatably connected to a side wall of the loading shell 402, one end of each loading plate 405 is screwed with each loading screw 403, each loading screw 403 is vertically arranged, and one end of each loading screw 403 is connected with a loading motor 404 in a transmission way. The bottom of the side wall of the loading shell 402 close to the storage mechanism 3 is provided with a feeding channel 406, and the feeding channel 406 communicates with the loading shell 402 and the storage shell 301.

By controlling the vertical driving parts to operate, the vertical driving parts drive the loading screws 403 to rotate, and the loading screws 403 drive the loading plates 405 to move upward. At this time, the frozen meat strips pushed from the storage shell 301 are stored on the loading plates 405. With an upward movement of the loading plates 405, the frozen meat strips are transported to the top, and then sent to the slicing mechanism 2 for slicing.

In an embodiment, the top of the loading shell 402 is horizontally and slidably connected with a bottom plate 408; the bottom of the bottom plate 408 is provided with a bottom plate rack, and the bottom plate rack is meshed with a bottom plate gear 409, and the bottom plate gear 409 is axially connected with a bottom plate motor. The top surface of the loading shell 402 is horizontally and slidably provided with an ejector block 407, the two ends of the ejector block 407 are fixedly connected with sliders of ejector ball screws 410, and the ends of the ejector ball screws 410 are drivingly connected with ejector motors 411, and a bottom surface of the ejector block 407 contacts the top surface of the bottom plate 408.

As the loading plates 405 move upward, when the frozen meat strips approach the bottom of the bottom plate 408, the bottom plate motor is controlled to rotate, the bottom plate motor drives the bottom plate gear 409 to rotate, and the bottom plate gear 409 drives the bottom plate rack to move, and the bottom plate rack drives the bottom plate 408 to move, so that the top of the loading shell 402 is opened. After the top of the loading shell 402 is opened, the loading plates 405 push the frozen meat strips to the top. At this time, the bottom plate motor is controlled to rotate reversely. The bottom plate 408 shovels the frozen meat strips on the loading plates 405 to the top surface of the bottom plate 408; the loading plates 405 move downward, and then the ejector motors 411 are controlled to rotate; and the ejector motors 411 drive the ball screws 410 to rotate, and the ball screws 410 drive the ejector block 407 to move, so that the frozen meat strips are pushed to the slicing mechanism 2 for slicing. When the frozen meat strips are about to be cut, the ejector block 407 moves to the right end. Repeated feedings are realized by repeat the above process, a waiting duration of the equipment is reduced, and the efficiency of slicing the meat sheets is improved.

Further optimized scheme, the bagging mechanism 5 includes side mounting plates 501 fixedly connected to front and rear sides of the frame 1; the side mounting plates 501 are located at the side of the sliding plate 6 far away from the slicing mechanism 2, and an inner side of each side mounting plate 501 is rotatably connected with two articulated arms 502, and bag opening negative pressure rollers 503 are rotatably connected between the tops of the two corresponding articulated arms 502 at the front and rear sides. The bag opening negative pressure rollers 503 are in hollow structures, and the side wall of each bag opening negative pressure roller 503 is provided with a plurality of bag opening negative pressure holes 5031; the bottom ends of two articulated arms 502 located on the same side are rotatably connected with two ends of a bag opening linear motor 504, and the inside of each side mounting plate 501 is provided with articulated arm chutes 505; a rotating shaft located at the bottom ends of the articulated arms 502 located on the same side is in sliding fit with the articulated arm chutes 505, one side of the articulated arms 502 far from the slicing mechanism 2 is provided with a bag feeding mechanism, and the bag opening negative pressure rollers 503 are in transmission connection with bag opening negative pressure roller motors 512. The bag opening negative pressure rollers 503 are rotationally connected to the outside of hollow shafts 7, and the side wall of each hollow shaft 7 is provided with a number of negative pressure holes 702.

One end of each hollow shaft 7 is in a closed structure, and the other end is connected with a negative pressure device, and the negative pressure device may be a negative pressure fan and other equipment that may generate a negative pressure. The hollow shafts 7 are fixedly connected with the frame 1 to control the operation of the negative pressure devices, and the negative pressure devices provide the negative pressure for the bag opening negative pressure rollers 503; each bag opening linear motor 504 is controlled to contract, the top ends of the two articulated arms 502 are close to each other, and the two bag opening negative pressure rollers 503 on the top ends are closely attached to each other. The bag feeding mechanism conveys a plastic bag between the lower parts of the two bag opening negative pressure rollers 503, and the bag opening negative pressure holes 5031 on the bag opening negative pressure rollers 503 absorb the two sides of the plastic bag. Then, the bag opening negative pressure roller motors 512 of the bag opening negative pressure rollers 503 are controlled to rotate, and the bag opening negative pressure rollers 503 roll up the two sides of the plastic bag, and then each bag opening linear motor 504 is controlled to stretch, so the two bag opening negative pressure rollers 503 are away from each other to spread the plastic bag. The plastic bag may be an easily torn food bag. The blocking structure is opened to make the meat sheets on the sliding plate 6 slide into the plastic bag. A conveyor belt assembly 9 may be arranged below the bagging mechanism 5, and the bagged frozen meat sheets may be transported to the outside of the equipment through the conveyor belt assembly 9 for a subsequent packaging.

Further optimized scheme, the bag feeding mechanism includes a bag feeding slide plate 506 horizontally arranged between two side mounting plates 501, the top of the bag feeding slide plate 506 is rotatably connected with a bag storing roller 507, the side of the bag storing roller 507 close to the articulated arms 502 is provided with a bag feeding roller 508, the bottom of the bag feeding slide plate 506 is fixedly connected with a bag feeding rack, the bag feeding rack is meshed with a bag feeding gear 509, and the bag feeding gear 509 is axially connected with a bag feeding motor. The bag storing roller 507 is connected with a bag storing roller motor 510, the bag feeding roller 508 is connected with a bag feeding roller motor 511, the side wall of the bag feeding roller 508 is provided with a plurality of bag feeding negative pressure holes 5081, a center of the bag feeding roller 508 is rotatably connected with the hollow shaft 7, and the outer side of the hollow shaft 7 of the bag feeding roller 508 is fixedly connected with an arc baffle 701, the outer side of the arc baffle 701 is in contact with the inner side of the bag feeding roller 508, and the arc baffle 701 is located at a lower part of the inner side of the bag feeding roller 508.

The blocking structure includes a blocking plate 601 vertically and slidably connected between the two side mounting plates 501. The blocking plate 601 is located at the bottom of the sliding plate 6, the bottom of the blocking plate 601 is in contact with a push slider 602, and the top of the push slider 602 is provided with an inclined plane with a same inclination direction as the sliding plate 6. One end of the push slider 602 far from the blocking plate 601 is fixedly connected with a blocking linear motor 603.

By controlling an extension or a contraction of the blocking linear motor 603, the blocking linear motor 603 makes the push slider 602 move, and the push slider 602 pushes the blocking plate 601 to move upwards, so as to achieve a purpose of blocking the frozen meat sheets. When the frozen meat sheets need to be released, the push slider 602 is kept away from the blocking plate 601, and the blocking plate 601 moves downwards with the gravity, so that the frozen meat sheets on the sliding plate 6 may fall down.

One end of the hollow shaft 7 of the bag feeding roller 508 is in a closed structure, and the other end is connected with a negative pressure device. The negative pressure device may be a negative pressure fan and other equipment that may generate the negative pressure. The hollow shaft 7 is fixedly connected with the frame 1. The negative pressure device is controlled to operate to provide the negative pressure for the bag feeding roller 508. At this time, the bag feeding negative pressure holes 5081 formed on the bag feeding roller 508 absorb the plastic bag above the bag feeding roller 508. The bag feeding motor is controlled to operate, the bag feeding motor drives the bag feeding gear 509 to rotate, and the bag feeding gear 509 pushes the bag feeding rack to move, and the bag feeding rack drives the bag feeding slide plate 506 to move in the direction of the articulated arms 502. At this time, the bag opening negative pressure rollers 503 on the two articulated arms 502 are in a bonded state, and the bag feeding roller 508 moves below the bag opening negative pressure rollers 503. At this time, the bag opening negative pressure roller motors 512, the bag storing roller motor 510 and the bag feeding roller motor 511 rotate simultaneously. Since the lower part of the inner wall of the bag feeding roller 508 is attached with the arc baffle 701, the plastic bag is separated from the bag feeding roller 508 and enters between the two bag opening negative pressure rollers 503. After the two bag opening negative pressure rollers 503 wind up the plastic bag, the bag storing roller motor 510 is controlled to stop rotating. Under a joint force of the bag opening negative pressure roller motors 512 and the bag feeding roller motor 511, the plastic bag is pulled off along its tear line, and then the bag feeding motor is controlled to rotate reversely. The bag feeding motor drives the bag feeding slide plate 506 away from the two bag opening negative pressure rollers 503, and then the two bag opening negative pressure rollers 503 stretch the plastic bag for bagging.

In an embodiment, the slicing mechanism 2 includes a gantry 201 fixedly connected to the top surface of the loading mechanism 4; the gantry 201 is located at the side far away from the storage mechanism 3, and the side far away from the storage mechanism 3 of the gantry 201 is vertically and slidably connected with a slicing knife 203, the upper part of the inner side of the gantry 201 is fixedly connected with a top fixing plate 202, and a slicing linear motor 204 is fixedly connected between the slicing knife 203 and the top fixing plate 202. The middle of the top fixing plate 202 is screwed with a plurality of pressing screws 214, and the adjacent pressing screws 214 have opposite screw directions. The bottom ends of the pressing screws 214 are rotatably connected with pressing mechanisms, and the top ends of the pressing screws 214 are rotatably connected with a vertical pressing part.

The slicing linear motor 204 is controlled to repeatedly extend and retract, and the slicing linear motor 204 drives the slicing knife 203 to move up and down to cut the sheets; the vertical pressing part is controlled to run, and the vertical pressing part drives the pressing screws 214 to rotate, and the pressing screws 214 push the pressing mechanisms to move down to press the frozen meat strips, so as to prevent the movement of the frozen meat strips from affecting a roll slicing effect.

In an embodiment, the vertical pressing part includes a vertical slide plate 205 vertically slidably connected in the gantry 201, and the vertical slide plate 205 is rotationally connected with the pressing screws 214. The top of each pressing screw 214 is fixedly connected with a meshing gear 206, and the adjacent meshing gears 206 mesh with each other. One pressing screw 214 is axially connected with a pressing motor 207, and the pressing motor 207 is fixedly connected with the vertical slide plate 205. The two ends of the vertical slide plate 205 are fixedly connected with pressing sliders 209, and the opposite inner side walls of the gantry 201 are provided with pressing chutes 208, and the pressing sliders 209 are in sliding fit with the pressing sliders 209.

The pressing motor 207 is controlled to rotate, the pressing motor 207 drives the pressing screws 214 to rotate, and the pressing screws 214 move up and down along the top fixing plate 202. At this time, the vertical slide plate 205 fixed with the pressing motor 207 moves accordingly, and the pressing screws 214 drive the lower pressing mechanisms to move, thus realizing a pressing function for the frozen meat strips.

In an embodiment, each pressing mechanism includes a pressing driving block 210 rotatably connected with the bottom end of each pressing screw 214, a plurality of vertical sliding rods 211 are slidably penetrated on each pressing driving block 210, one pressing block 213 is fixedly connected to the bottom ends of every four vertical sliding rods 211, pressing springs 212 are fixedly connected between each pressing block 213 and each pressing driving block 210, and the pressing springs 212 are sleeved outside each vertical sliding rod 211.

As the pressing screws 214 move, the pressing screws 214 press the pressing driving blocks 210 downward, and the pressing driving blocks 210 push the pressing springs 212 downward. The pressing springs 212 push the pressing blocks 213 downward, and the pressing blocks 213 press the frozen meat strips. Under an elastic force of the pressing springs 212, the pressing blocks 213 may press the frozen meat strips. Since the pressing springs 212 have a certain elasticity, the frozen meat strips are not crushed. At the same time, the pressing springs 212 may assist the loading mechanism 4 and the ejector block 407 to feed the frozen meat strips into the pressing blocks 213.

In the description of the application, it should be understood that the terms "vertical", "horizontal", "top", "bottom", "front", "back", "left", "right", "vertical", "horizontal", "top", "bottom", "inside", "outside" and other directions or positional relationships indicated are based on the directions or positional relationships shown in the drawings, only for the convenience of describing the application, rather than indicating or implying that the device or element referred to must have a specific orientation, be constructed and operated in a specific orientation, it cannot be understood as a limitation of the application.

The above-mentioned embodiments only describe a preferred mode of the application, but do not limit the scope of the application. On a premise of not departing from the design spirit of the application, all kinds of modifications and improvements made by ordinary technicians in the field to the technical scheme of the application shall fall within the scope of protection determined by claims of the application.

What is claimed is:

1. A slicing and collecting device for processing frozen meat sheets, comprising a frame, wherein a slicing mechanism is arranged above the frame; a sliding plate is arranged on one side of the slicing mechanism, and a bagging mechanism is arranged on one side of the sliding plate far away from the slicing mechanism; a blocking structure is arranged between the sliding plate and the bagging mechanism, a loading mechanism is arranged on an other side of the slicing mechanism, a storage mechanism is arranged on one side of the loading mechanism further away from the slicing mechanism, and a bottom of the loading mechanism is communicated with the storage mechanism; the slicing mechanism is configured to cut frozen meat, the storage mechanism is used to store the frozen meat and send the frozen meat to the loading mechanism, the loading mechanism is configured to send the frozen meat to the slicing mechanism, and the bagging mechanism is configured to bag the frozen meat cut by the slicing mechanism; the bagging mechanism comprises side mounting plates fixedly connected to front and rear sides of the frame; the side mounting plates are located at one side of the sliding plate further away from the slicing mechanism, and an inner side of each side mounting plate is rotatably connected with two articulated arms, and bag opening negative pressure rollers are rotatably connected between tops of the two corresponding articulated arms at a front side and a rear side; the bag opening negative pressure rollers are in hollow structures, and a side wall of each bag opening negative pressure roller is provided with a plurality of bag opening negative pressure holes; bottom ends of two articulated arms located on a same side are rotatably connected with two ends of a bag opening linear motor, and an inside of each side mounting plate is provided with articulated arm chutes; a rotating shaft located at the bottom ends of the articulated arms located on the same side is in sliding fit with the articulated arm chutes, one side of the articulated arms further from the slicing mechanism is provided with a bag feeding mechanism, and the bag opening negative pressure rollers are in transmission connection with bag opening negative pressure roller motors; the bag opening negative pressure rollers are rotationally connected to an outside of hollow shafts, and the side wall of each hollow shaft is provided with a number of negative pressure holes; and the bag feeding mechanism comprises a bag feeding slide plate horizontally arranged between two side mounting plates, a top of the bag feeding slide plate is rotatably connected with a bag storing roller, a side of the bag storing roller close to the articulated arms is provided with a bag feeding roller, a bottom of the bag feeding slide plate is fixedly connected with a bag feeding rack, the bag feeding rack is meshed with a bag feeding gear, and the bag feeding gear is axially connected with a bag feeding motor; the bag storing roller is connected with a bag storing roller motor, the bag feeding roller is connected with a bag feeding roller motor, a side wall of the bag feeding roller is provided with a plurality of bag feeding negative pressure holes, a center of the bag feeding roller is rotatably connected with the hollow shaft, and an outer side of the hollow shaft of the bag feeding roller is fixedly connected with an arc baffle, an outer side of the arc baffle is in contact with an inner side of the bag feeding roller, and the arc baffle is located at a lower part of the inner side of the bag feeding roller.

2. The slicing and collecting device for processing the frozen meat sheets according to claim 1, wherein the storage mechanism comprises a storage shell, and the storage shell is fixedly connected above the frame; a plurality of storage partitions are arranged in the storage shell at equal intervals, and a feeding structure is arranged under a bottom of the storage shell; the bottom of the storage shell is provided with a plurality of bottom located grooves, and each bottom located groove is located between every two storage partitions, and the feeding structure partially extends into the bottom located grooves.

3. The slicing and collecting device for processing the frozen meat sheets according to claim 2, wherein the feeding structure comprises a horizontally sliding feeding slide plate, a top of the feeding slide plate is rotatably connected with a plurality of feeding stoppers, and each feeding stopper has an L-shaped structure; one end of each feeding stopper extends into each bottom located groove, and an other end of each feeding stopper is set away from the slicing mechanism; a feeding spring is fixedly connected between a bottom surface of the other end of each feeding stopper and a top surface of the feeding slide plate, and both ends of the feeding slide plate are slidably connected with feeding slide rails, and the feeding slide rails are fixedly connected with the frame.

4. The slicing and collecting device for processing the frozen meat sheets according to claim 2, wherein the loading mechanism comprises a loading shell fixedly connected to a top of the frame, a plurality of loading baffles are arranged in the loading shell at equal intervals, a plurality of loading plates are vertically and slidably arranged at a bottom of the loading shell, each loading plate is located between every two loading baffles, and one end of each loading baffle is connected with a vertical driving part in a transmission way; each vertical driving part comprises a loading screw rotatably connected to a side wall of the loading shell, one end of each loading plate is screwed with each loading screw, each loading screw is vertically arranged, and one end of each loading screw is connected with a loading motor in a transmission way; a bottom of a side wall of the loading shell close to the storage mechanism is provided with a feeding channel, and the feeding channel communicates with the loading shell and the storage shell.

5. The slicing and collecting device for processing the frozen meat sheets according to claim 4, wherein a top of the loading shell is horizontally and slidably connected with a bottom plate; a bottom of the bottom plate is provided with a bottom plate rack, and the bottom plate rack is meshed with a bottom plate gear, and the bottom plate gear is axially connected with a bottom plate motor; a top surface of the loading shell is horizontally and slidably provided with an ejector block, two ends of the ejector block are fixedly connected with sliders of ejector ball screws, and ends of the ejector ball screws are drivingly connected with ejector motors, and a bottom surface of the ejector block contacts a top surface of the bottom plate.

6. The slicing and collecting device for processing the frozen meat sheets according to claim 1, wherein the blocking structure comprises a blocking plate vertically and slidably connected between the two side mounting plates; the blocking plate is located at a bottom of the sliding plate, a bottom of the blocking plate is in contact with a push slider, and a top of the push slider is provided with an inclined plane with a same inclination direction as the sliding plate; one end of the push slider further from the blocking plate is fixedly connected with a blocking linear motor.

7. The slicing and collecting device for processing the frozen meat sheets according to claim 1, wherein the slicing mechanism comprises a gantry fixedly connected to a top surface of the loading mechanism; the gantry is located at a side further away from the storage mechanism, and the side far away from the storage mechanism of the gantry is vertically and slidably connected with a slicing knife, an upper part of an inner side of the gantry is fixedly connected with a top fixing plate, and a slicing linear motor is fixedly connected between the slicing knife and the top fixing plate; a middle of the top fixing plate is screwed with a plurality of pressing screws, and the adjacent pressing screws have opposite screw directions; bottom ends of the pressing screws are rotatably connected with pressing mechanisms, and top ends of the pressing screws are rotatably connected with a vertical pressing part.

8. The slicing and collecting device for processing the frozen meat sheets according to claim 7, wherein the vertical pressing part comprises a vertical slide plate vertically slidably connected in the gantry, and the vertical slide plate is rotationally connected with the pressing screws; a top of each pressing screw is fixedly connected with a meshing gear, and the adjacent meshing gears mesh with each other; one pressing screw is axially connected with a pressing motor, and the pressing motor is fixedly connected with the vertical slide plate; two ends of the vertical slide plate are fixedly connected with pressing sliders, and opposite inner side walls of the gantry are provided with pressing chutes, and the pressing sliders are in sliding fit with the pressing sliders.

9. The slicing and collecting device for processing the frozen meat sheets according to claim 7, wherein each pressing mechanism comprises a pressing driving block rotatably connected with a bottom end of each pressing screw, a plurality of vertical sliding rods are slidably penetrated on each pressing driving block, one pressing block is fixedly connected to bottom ends of every four vertical sliding rods, pressing springs are fixedly connected between each pressing block and each pressing driving block, and the pressing springs are sleeved outside each vertical sliding rod.

\* \* \* \* \*